(12) United States Patent
Lagnado et al.

(10) Patent No.: US 7,881,682 B2
(45) Date of Patent: Feb. 1, 2011

(54) SYSTEM AND METHOD FOR CONFIGURING A WIRELESS MODULE POWER LIMIT

(75) Inventors: Isaac Lagnado, Houston, TX (US); Ming He, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 830 days.

(21) Appl. No.: 11/699,539

(22) Filed: Jan. 29, 2007

(65) Prior Publication Data
US 2008/0182531 A1    Jul. 31, 2008

(51) Int. Cl.
H04B 17/00    (2006.01)
H04K 3/00    (2006.01)

(52) U.S. Cl. .................. 455/115.1; 455/127.1
(58) Field of Classification Search ............ 455/115.1, 455/127.1–127.3
See application file for complete search history.

(56) References Cited

U.S. PATENT DOCUMENTS

| 6,029,074 | A | 2/2000 | Irvin | |
|---|---|---|---|---|
| 6,801,759 | B1 | 10/2004 | Saifuddin | |
| 7,529,523 | B1 * | 5/2009 | Young et al. | 455/115.1 |
| 2006/0050798 | A1 | 3/2006 | Odigie et al. | |

FOREIGN PATENT DOCUMENTS

| JP | 411088084 | * 3/1999 |
|---|---|---|
| JP | 14290260 | 10/2002 |

OTHER PUBLICATIONS

International Search Report dated Jun. 2, 2008.

* cited by examiner

Primary Examiner—Lee Nguyen

(57) ABSTRACT

A system for configuring a wireless module power limit comprises a wireless module having a control module configured to automatically select a power limit setting from one of a plurality of power limit settings to set a maximum output power level for the wireless module to enable an antenna coupled to the wireless module to radiate at a predetermined power level.

19 Claims, 2 Drawing Sheets

SYSTEM AND METHOD FOR CONFIGURING A WIRELESS MODULE POWER LIMIT

BACKGROUND OF THE INVENTION

Wireless devices, such as notebook computers, cellular telephones, etc., are subject to regulatory limits on an amount of power that can be used to radiate wireless signals. To reduce manufacturing, inventory and tracking costs, a single model of wireless module is used in different types of wireless devices and/or different configurations of a same type of wireless devices. However, because the radiation efficiency (i.e., a measure of the portion of energy produced by a wireless module which is actually radiated from an antenna) for different devices and/or configurations of the same type of device vary (e.g., resulting from physical design differences, different cable lengths, etc.), wireless devices having a lower radiation efficiency operate at sub-optimal performance such that the wireless device is transmitting wireless signals at a power level considerably less than the regulatory limit.

BRIEF DESCRIPTION OF THE DRAWINGS

For a more complete understanding of the present invention, the objects and advantages thereof, reference is now made to the following descriptions taken in conjunction with the accompanying drawings, in which.

DETAILED DESCRIPTION OF THE DRAWINGS

Figure 1:
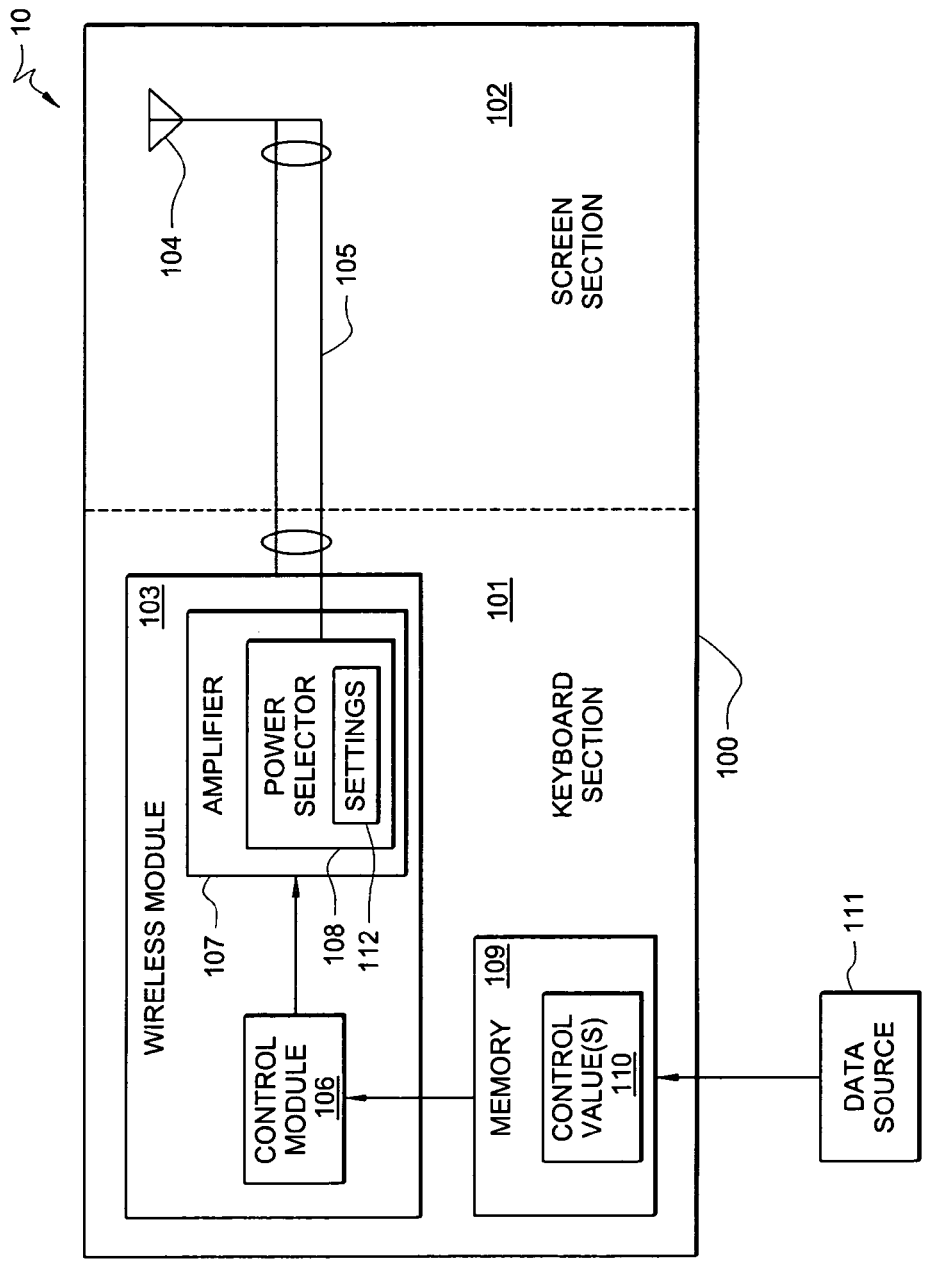
FIG. 1 is a block diagram illustrating an embodiment of a system for configuring a wireless module power limit.

FIG. 1 is a block diagram illustrating an embodiment of a system 10 for configuring a wireless transmitter power limit. In the embodiment illustrated in FIG. 1, system 10 is implemented in a wireless communication device 100. In FIG. 1, wireless communication device 100 comprises a notebook computer having a keyboard section 101 and a screen section 102. However, it should be understood that wireless communication device 100 may comprise any type of device capable of wirelessly communicating such as, but not limited to, a personal digital assistant (PDA), desktop computer, cellular communication device or gaming device.

In the embodiment illustrated in FIG. 1, system 10 comprises a wireless module 103 disposed in keyboard section 101 of wireless communication device 100 and communicatively coupled to an antenna 104 disposed in screen section 102 by a communication medium 105. However, it should be understood that wireless module 103 and/or antenna 104 may be located elsewhere in wireless communication device 100. Communication medium 105 may comprise any type of medium for communicating signals, electrical power, etc., between wireless module 103 and antenna 104 such as, but not limited, a cable, a microstrip transmission line, a waveguide, or a printed circuit board. In operation, wireless module 103 provides radio frequency power to antenna 104 that is used for transmitting wireless communications.

In operation, the power radiated from antenna 104 is generally less than the power output by module 103 because communication medium 105 introduces a coupling loss. Thus, not all of the power output by module 103 reaches and/or is otherwise radiated by antenna 104. In order for antenna 104 to radiate at a predetermined power level, which may be a regulated maximum limit or another desired power level, wireless module 103 must output excess power to compensate for the coupling loss. The amount of excess power needed is determined, at least in part, by the coupling loss introduced by communication medium 105. For example, different lengths of a cable coupling antenna 104 to wireless module 103 will introduce different amounts of coupling loss.

In the embodiment illustrated in FIG. 1, wireless module 103 comprises a control module 106 and an amplifier 107. Amplifier 107 provides the electrical power that is transmitted through medium 105 and used by antenna 104 to transmit wireless signals. In the embodiment illustrated in FIG. 1, amplifier 107 comprises a power selector 108 having at least two settings 112 that are selectable by control module 106 to set a power limit of wireless module 103. Power selector 108 may comprise a logic circuit or another switching mechanism that is configurable using an electronic signal from control module 106. Preferably, at least one setting 112 of power selector 108 is configured to accommodate an anticipated coupling loss (e.g., introduced by the particular medium 105 coupling antenna 104 to wireless module 103 and/or other factors or elements) such that a maximum power limit is identified and configured for wireless module 103 based on the particular configuration of wireless communication device 100. For example, based on the particular antenna 104, communication medium 105, etc., setting 112 is identified and selected to enable amplifier 107 to output power at a level compensating for any coupling loss or other losses while maintaining a power output of antenna 104 at or below a desired limit (e.g., a limit set by a regulatory agency or otherwise). Thus, embodiments of system 10 enable a single wireless module 103 to be used and/or calibrated for a variety of different configurations of wireless communication device 100 such that a maximum output power limit for the wireless module 103 is set and/or adjusted for the particular configuration (e.g., accommodating anticipated output power losses) while ensuring that a maximum output power at antenna 104 is at or below a predetermined and/or desired limit.

In FIG. 1, system 10 also comprises a memory 109 disposed in wireless communication device 100 and coupled to control module 106 for storing at least one control value 110 that is used by control module 106 to select a particular setting 112 of power selector 108 for amplifier 107. Memory 109 could be non-volatile firmware memory, such as flash memory, volatile memory, user-modifiable memory, or permanent storage such as a digital media disk. In operation, control module 106 retrieves and/or otherwise obtains one or more control values 110 from memory 109 to adjust and/or otherwise set power selector 108. Control values 110 may be retrieved from memory 109 as part of a boot-up process of wireless communication device 100 and/or when wireless module 103 is initialized or otherwise configured for operation.

Control module 106 performs any computations that are necessary for any control values 110 from memory 109 to be translated to an appropriate setting 112 of power selector 108. For example, in some embodiments, control values 110 in memory 109 comprise a designated limit setting for amplifier 107, and control module 106 uses a look-up table or similar logic to translate the limit to a setting 112 of power selector 108. Alternatively, memory 109 may comprise control values 110 specifying both the radiation limit and the coupling loss introduced by medium 105. Control module 106 would then calculate the excess power required from amplifier 107 that is necessary to ensure antenna 104 radiates at or near the desired limit. As yet another alternative, if power selector 108 is configured by indexing a setting, control values 110 may comprise the pre-determined index value so that control module 106 merely passes along the index value. It should be understood that multiple possible configuration methods may be used to translate or calculate a power limit setting 112 using one or more control values 110 stored in memory 109.

In the embodiment illustrated in FIG. 1, a data source 111 is used to write control value 110 information into memory 109. Data source 111 may be a flash memory writer or a can be another device couplable to wireless communication device 100 to facilitate writing control value 110 to memory 109 (e.g., during manufacturing of communication device 100, during a modification process associated with communication device 100, or at some other time). Thus, embodiments of system 10 enable control values 110 to be changed and/or replaced with one or more new values 110. Multiple events may trigger a change in control values 110 such as, but not limited to, medium 105 is swapped out for a medium of a different length or having a different coupling loss associated therewith, wireless module 103 is replaced with one using a different power selection index, antenna 104 is replaced with one that radiates differently, or the desired power limit changes (e.g. in response to a change in a regulated radiated power limit).

Figure 2:
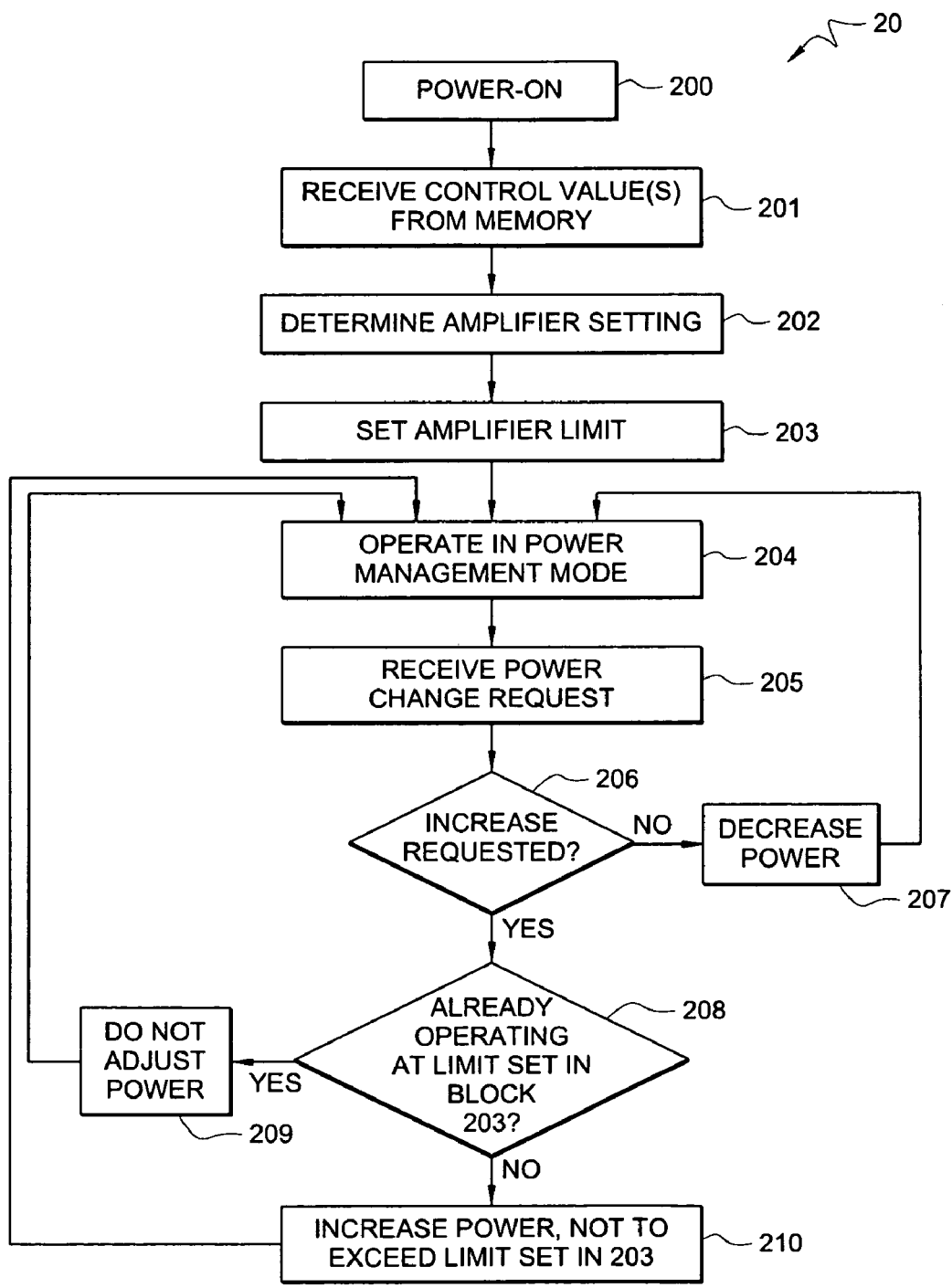
FIG. 2 is a flow diagram illustrating an embodiment of a method for configuring a wireless module power limit.

FIG. 2 is a flow diagram illustrating an embodiment of a method 20 for configuring a wireless transmitter power limit. Wireless module 103 is powered-on at block 200 when a user turns on wireless communication device 100. As part of the initialization process for wireless module 103, control module 106 retrieves control values 110 from memory 109 at block 201. Control module 106 may request control values 110 from memory 109 or wireless communication device 100 may be configured to automatically provide values 110 to control module 106 as part of a boot-up process of wireless communication device 100.

At block 202, control module 106 determines a setting 112 for amplifier 107. At block 203, control module 106 sets power selector 108 to the indicated or derived setting 112. The setting 112 enables amplifier 107 to operate up to, but not above, a power limit which is necessary for antenna 104 to radiate at a desired power level after the coupling losses introduced by medium 105 or other elements.

It should be understood that the selected setting 112 is a limit or maximum threshold and is not necessarily the maximum operating power of wireless module 103. Wireless module 103 may also operate in a power management mode where wireless module 103 operates at a power level resulting in radiation at a level below a desired/predetermined limit. In power management mode, another device instructs wireless module 103 to adjust the transmitted power level (e.g. increase or decrease) based on a signal-to-noise ratio (SNR) in a remote receiver that is some distance away from wireless communication device 100. The setting 112 of power selector 108 defines the maximum power limit which wireless module 103 will not exceed even if it is capable of producing more power and a power management system is requesting that wireless module 103 increase its power.

At block 204, wireless module 103 awaits power management mode instructions for either increasing or decreasing the transmitted power level. At block 205, control module 106 receives a request to change the output power level. Wireless module 103 identifies the request as one for either an increase or decrease at decision block 206. If the request is for a power level decrease, wireless module 103 complies as shown at block 207, and method 20 returns to block 204. If the request is for a power level decrease, then at decision block 208, wireless module 103 determines whether it is already operating at the limit set at block 203. If so, the power level is not increased, as indicated by block 209, and method 20 returns to block 204 with the power level unchanged. If wireless module 103 is operating below the limit set at block 203, then wireless module 103 increases the power level at block 210 as requested but not exceeding any limit set at block 203. Method 20 returns to block 204 where wireless module 103 awaits any further adjustment instruction for power level adjustment.

It should be understood that in the described method, certain functions may be omitted, accomplished in a sequence different from that depicted in FIG. 2, or simultaneously performed. Also, it should be understood that the method depicted in FIG. 2 may be altered to encompass any of the other features or aspects as described elsewhere in the specification. Further, embodiments may be implemented in software and can be adapted to run on different platforms and operating systems. In particular, functions implemented by control module 106, for example, may be provided as an ordered listing of executable instructions that can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium.

What is claimed is:

1. A method for configuring a wireless module power limit, comprising:
   automatically selecting a power limit setting from one of a plurality of power limit settings of a wireless module to set a maximum output power level for the wireless module to enable an antenna coupled to the wireless module to radiate at a predetermined power level.

2. The method of claim 1 further comprising retrieving at least one control value indicating the power limit setting to select from a memory.

3. The method of claim 1 further comprising selecting the power limit setting to compensate for a coupling loss associated with coupling the wireless module to the antenna.

4. The method of claim 1 further comprising selecting the power limit in response to initialization of the wireless module.

5. The method of claim 1 wherein selecting the power limit setting comprises selecting the power limit setting from a plurality of power limit settings of an amplifier of the wireless module.

6. The method of claim 1 further comprising storing a control value indicating the power limit setting to select in a memory coupled to the wireless module.

7. The method of claim 1 wherein selecting the power limit setting comprises communicating a control signal from a control module of the wireless module to an amplifier of the wireless module.

8. A system for configuring a wireless module power limit, comprising:
   a wireless module having a control module configured to automatically select a power limit setting from one of a plurality of power limit settings to set a maximum output power level for the wireless module to enable an antenna coupled to the wireless module to radiate at a predetermined power level.

9. The system of claim 8 wherein the selected power limit setting compensates for a coupling loss associated with coupling the wireless module to the antenna.

10. The system of claim 8 wherein the plurality of power limit settings are associated with an amplifier of the wireless module.

11. The system of claim 8 further comprising a memory storing at least one control value indicating the power limit setting to select.

12. The system of claim 8 wherein the control module is configured to select the power limit setting in response to initialization of the wireless module.

13. The system of claim 8 wherein the control module is configured to retrieve a control value from a memory indicating the power limit setting to select.

14. The system of claim 8 wherein the control module is configured to transmit a control signal to an amplifier of the wireless module for selecting the power limit setting.

15. A system for configuring a wireless module power limit, comprising:

means for automatically selecting a power limit setting from one of a plurality of power limit settings of a wireless module means to set a maximum output power level for the wireless module means to enable an antenna means coupled to the wireless module means to radiate at a predetermined power level.

16. The system of claim 15 further comprising a memory means storing at least one control value indicating the power limit setting to select.

17. The system of claim 15 wherein the selected power limit setting is configured to compensate for a coupling loss associated with coupling the wireless module means to the antenna means.

18. The system of claim 15 wherein the selecting means is configured to select the power limit setting in response to initialization of the wireless module means.

19. The system of claim 15 wherein the selecting means is configured to select the power limit setting from a plurality of power limit settings of an amplifier means of the wireless module means.

* * * * *